US005094301A

United States Patent [19]

Wipperman et al.

[11] Patent Number: 5,094,301

[45] Date of Patent: Mar. 10, 1992

[54] PROGRAMMABLE PULSED TORQUE RECOVERY SYSTEM

[75] Inventors: Lloyd H. Wipperman, Rochester Hills; Curt D. Gilmore, Fenton, both of Mich.

[73] Assignee: Dresser Industries, Inc., Dallas, Tex.

[21] Appl. No.: 489,177

[22] Filed: Mar. 5, 1990

Related U.S. Application Data

[63] Continuation-in-part of Ser. No. 461,611, Jan. 5, 1990, abandoned.

[51] Int. Cl.[5] ..... B23Q 5/00

[52] U.S. Cl. ..... 173/1; 173/5; 73/761; 81/469

[58] Field of Search ..... 173/1, 12, 5, 20; 81/469; 29/407, 446; 73/761, 862.21, 862.22, 862.23; 307/119, 124; 318/434, 488

[56] References Cited

U.S. PATENT DOCUMENTS

| | | | |
|---|---|---|---|
| Re. 31,569 | 5/1984 | Eshghy | 29/407 |
| 2,569,244 | 9/1951 | Larson | 81/54 |
| 3,965,778 | 6/1976 | Aspers et al. | 81/52.4 R |
| 4,016,938 | 4/1977 | Rice | 173/1 |
| 4,019,589 | 4/1977 | Wallace | 173/12 |
| 4,074,772 | 2/1978 | Jonsson | 173/12 |
| 4,084,487 | 4/1978 | Wallace | 91/325 |
| 4,121,670 | 10/1978 | Antipov et al. | 173/20 |
| 4,147,219 | 4/1979 | Wallace | 173/12 |
| 4,544,039 | 10/1985 | Crane | 173/12 |
| 4,908,926 | 3/1990 | Takeshima et al. | 29/446 |

*Primary Examiner*—Mark Rosenbaum
*Assistant Examiner*—Allan M. Schrock
*Attorney, Agent, or Firm*—Daniel R. Alexander

[57] ABSTRACT

A method and apparatus for recovering torque lost due to joint relaxation in threaded fastener assemblies or joints. The present invention is especially adapted for use with medium-to-short or gasketed joints. In the practice of an exemplary embodiment of the invention, the torque of an electric nutrunner is pulsed at the end of a fastener tightening cycle between programmed maximum and minimum torque values which have been selected to overcome the static to dynamic torque ratio of the joint while maintaining the motor and gearing of the nutrunner in a loaded condition to ensure maximum nutrunner durability.

10 Claims, 5 Drawing Sheets

DC MOTOR PROGRAMMING

STATION NAME.....(F4): WHEELNUT RIGHT ALGORITHM..........: DMMF
NUMBER OF SPINDLES.....: 5 DC PROGRAM SET...(F5): 2

CHANGING FULL SCALE VALUES AFFECT SETPOINTS

MOTOR SPEED @ 10V = 166.00 (RPM)
MOTOR TORQUE @ 10V = 194.64 (ENG. UNITS...EU)

| | TIME (SEC.) | SPEED (RPM) | TORQUE (E.U.) | (F)wd (R)ev | Spin. Module Lim. set# | Spin. Module Cycle-on? (Y/N) | Sync. Req'd (Y/N) | Expedite on Sync? (Y/N) | Sync. method (N/S/D/T) |
|---|---|---|---|---|---|---|---|---|---|
| STEP 1 | 2.0 | 100.0 | 5.0 | F | 3 | Y | N | Y | T |
| STEP 2 | 1.0 | 50.0 | 30.0 | F | 3 | Y | N | Y | T |
| STEP 3 | 1.0 | 30.0 | 50.0 | F | 3 | Y | N | Y | T |
| STEP 4 | 0.0 | 0.0 | 0.0 | F | 1 | N | N | N | N |
| STEP 5 | 0.0 | 0.0 | 0.0 | F | 1 | N | N | N | N |

Fig.4

PROGRAM JOGS, BACK-OUTS & IMPULSE STATION NAME: WHEELNUT RIGHT

| | |
|---|---|
| FULL SCALE MOTOR SPEED= | 166.00 |
| FULL SCALE TORQUE= | 194.64 |
| JOG SPEED: | 49.98 |
| (Max) JOG TORQUE: | 50.00 |
| INITIAL BACK-OUT SPEED: | 19.98 |
| (Max) INITIAL BACK-OUT TORQUE: | 120.02 |
| MAINTAINED BACK-OUT TORQUE: | 100.01 |
| (Max) MAINTAINED BACK-OUT TORQUE: | 59.98 |

| DC PROGRAM SET: | 1 | 2 | 3 | 4 |
|---|---|---|---|---|
| CYCLE STEP "Final"= | 100.01 | 50.00 | 0.00 | 0.00 |
| PULSE TORQUE RECOVERY HI: | 0.00 | 50.00 | 0.00 | 0.00 |
| PULSE TORQUE RECOVERY LO: | 0.00 | 25.00 | 0.00 | 0.00 |
| P.T.R. TIME DURATION: | 0.0 | 1.0 | 0.0 | 0.0 |

Fig.5

PROGRAMMABLE PULSED TORQUE RECOVERY SYSTEM

CROSS-REFERENCE TO RELATED APPLICATIONS

This application is a continuation-in-part of copending application Ser. No. 07/461,611, filed Jan. 5, 1990, now abandoned as 9/18/91.

BACKGROUND OF THE INVENTION

This invention relates to a system and process for tightening threaded fasteners to a final predetermined condition and, more particularly, it concerns such a system and process which compensates for joint relaxation.

Typically, a joint or joint assembly is made up of two or more work pieces joined together by one or more threaded fasteners, such as a nut and a threaded stud, a nut and a bolt, or a bolt and a threaded opening in one of the joint pieces. In many applications, it is necessary or desirable to have each of the threaded fasteners brought to a predetermined condition of torque. For example, in assembling a head to an engine block it is desired to have each of the fasteners brought to the same torque condition so that the contact pressure between the joint pieces is uniform across the joint.

Modern production facilities utilize single or multiple pneumatic or electric nutrunning tools (spindles) to rundown threaded fasteners and, thereby, assemble joints. Conventional nutrunning tool control systems or methods, such as torque control or stall, turn-of-the-nut, yield point, and two stage (two speed), use torque and angle sensors associated with the nutrunners to control nutrunner operation to set each fastener at a predetermined final or target torque. Examples of such conventional fastening systems and techniques are disclosed in U.S. Pat. Nos. Re 31,569 issued to S. Eshghy on May 1, 1984, 3,965,778 issued to A. J. Aspers et al on June 29, 1976, and 4,016,938 issued to E. E. Rice on Apr. 12, 1977.

Joint relaxation due to, for example, metal flow, gasket compression, or gasket flow reduces the joint clamp load and torque retention of the fasteners. Joint relaxation following a fastener tightening operation results in a true final torque and clamp load on the fastener which is less than the desired fastener torque and clamp load. Torque and load loss due to joint relaxation is especially troublesome in soft or gasketed joints.

Pulse driven pneumatic nutrunners and impact wrenches are known in the joint fastening art. Examples of such pneumatic tools are described in U.S. Pat. Nos. 2,569,244 issued to G. B. Larson on Sept. 25, 1951, 4,019,589 issued to W. K. Wallace on Apr. 26, 1977, 4,084,487 issued to W. K. Wallace on Apr. 18, 1978, 4,121,670 issued to G. A. Antipov et al on Oct. 24, 1978, and 4,544,039 issued to D. O. Crane on Oct. 1, 1985. Pneumatic pulse or impact wrenches tend to suffer from undesirable motor and gear wear because the motor and gearing relax between drive pulses.

Attempts at utilizing pneumatic nutrunners or motors to provide oscillating or impacting torque recovery have been less than adequate in that such systems are subject to the above-mentioned undesirable motor and gear wear, are mechanical rather than programmable in nature and as such are not easily adapted to a variety of joint applications, and/or require the use of rather complex and, as such, expensive tools, for example, having both primary and secondary motors to provide torque pulsations.

In light of the foregoing, there is a need for an improved fastening system and method which compensates for joint relaxation.

SUMMARY OF THE INVENTION

In accordance with the present invention, a system and method for tightening threaded fastener assemblies or joints is provided by which joint relaxation is compensated for by oscillating the drive torque of a tightening tool at the end of a tightening cycle and in a manner which causes the threaded fastener to rotate if the joint relaxes while not allowing the tightening tool motor and gearing to relax between pulses so as to avoid undue machine wear.

In accordance with the preferred embodiment, the present invention is directed to a programmable electric nutrunner fastening system and technique for recovering torque loss due to joint relaxation. In the practice of the present invention, an analog nutrunner motor drive signal is oscillated or pulsed at the end of a tightening cycle at a programmed frequency and amplitude based on the particular joint application. As such, the present invention compensates or corrects for joint relaxation in threaded fastener assemblies or bolted joints and, thereby, ensures the highest or optimum clamp load and torque retention. The present invention is especially, although not exclusively, adapted for use with gasketed joints and other medium-to-soft joints.

A principle object of the present invention is the provision of a pulsed torque recovery method and apparatus which corrects for joint relaxation. Another and more specific object of the present invention is to provide a programmable system and method which is readily adaptable to a variety of joint materials and applications. Yet another object of the present invention is the provision of a pulsed torque system and process by which the static to dynamic torque condition of the joint is overcome. Yet still another object of the present invention is provided by an embodiment which allows for the selection of a pulse minimum amplitude which ensures that the nutrunner motor and gearing remain under load. A further object of the present invention is the provision of a pulsed torque recovery system which utilizes a ramped torque increase to reduce drive tool gear wear. Other objects and further scope of applicability of the present invention will become apparent from the detailed description to follow taken in conjunction with the accompanying drawings in which like parts are designated by like reference numerals.

BRIEF DESCRIPTION OF THE DRAWINGS

FIG. 4 is a schematic representation of an exemplary DC Motor Programming Cycle Steps and Full-Scales screen associated with the present system; and FIG. 5 is a schematic illustration of an exemplary DC Motor Programming Program Jogs, Backouts, and Pulse Torque Recovery Setpoints screen in accordance with an embodiment of the present invention.

DETAILED DESCRIPTION OF THE PREFERRED EMBODIMENTS

Figure 1:
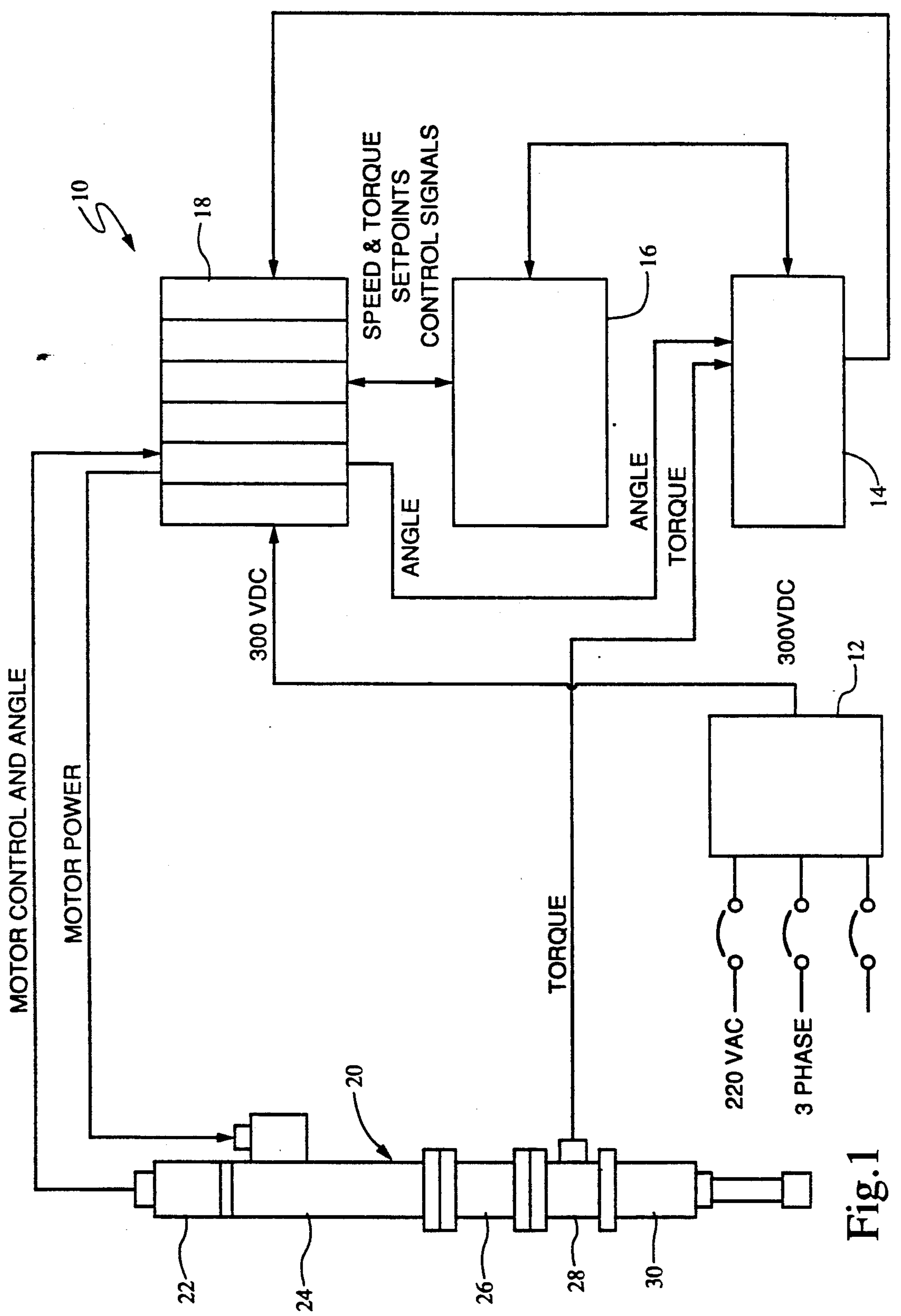
FIG. 1 is a schematic diagram illustrating an exemplary electric nutrunner system in accordance with the present invention.

In FIG. 1 of the drawings, an exemplary electric nutrunner system in accordance with the present invention is generally designated by the reference numeral 10 and shown to include as components an AC/DC converter 12, quality monitoring and control electronics 14, a Programmable Logic Controller (PLC) 16, a DC-motor servo controller 18, and one or more motors or nutrunners 20. Each of the motors 20 includes a resolver 22, a brushless motor 24, a gear set 26, a transducer 28, and a spindle 30. It is preferred that the motors 20 are EMT Series brushless DC motors from ITD Automation of Troy, Mich.

In accordance with a preferred embodiment of the present system, the quality monitoring and control electronics 14 includes an industrialized IBM-PC, floppy and hard disk memory units, spindle modules, a keyboard, and a CRT display. Further, in accordance with the preferred embodiment, the PLC 16 function is provided by the control electronics 14. Also, it is preferred that the servo controller 18 is made up of one or more ITD Automation modular Servo Amplifier Systems each of which includes a power supply module and as many as five servo amplifier modules with matching individual spindle backplane modules. A preferred electric nutrunner system for the practice of the present invention is the DL3 Fastening System by ITD Automation of Troy, Mich.

With reference again to the exemplary electric nutrunner system 10 shown in FIG. 1 of the drawings, power to the nutrunner 20 is controlled by the DC-motor servo controller 18 based on motor control and angle signals from the resolver 22 mounted on the brushless motor 24. Torque signals from the transducer 28 and angle of rotation signals developed by the servo controller 18 are monitored by, for example, spindle modules, in the control electronics 14. Control signals from, for example, spindle modules in the control electronics 14 are sent to the servo controller 18 to shut off the motor 20 when torque and angle targets are achieved. Motor speed and torque reference signals are provided to the servo controller 18 by the PLC 16.

Figure 2:
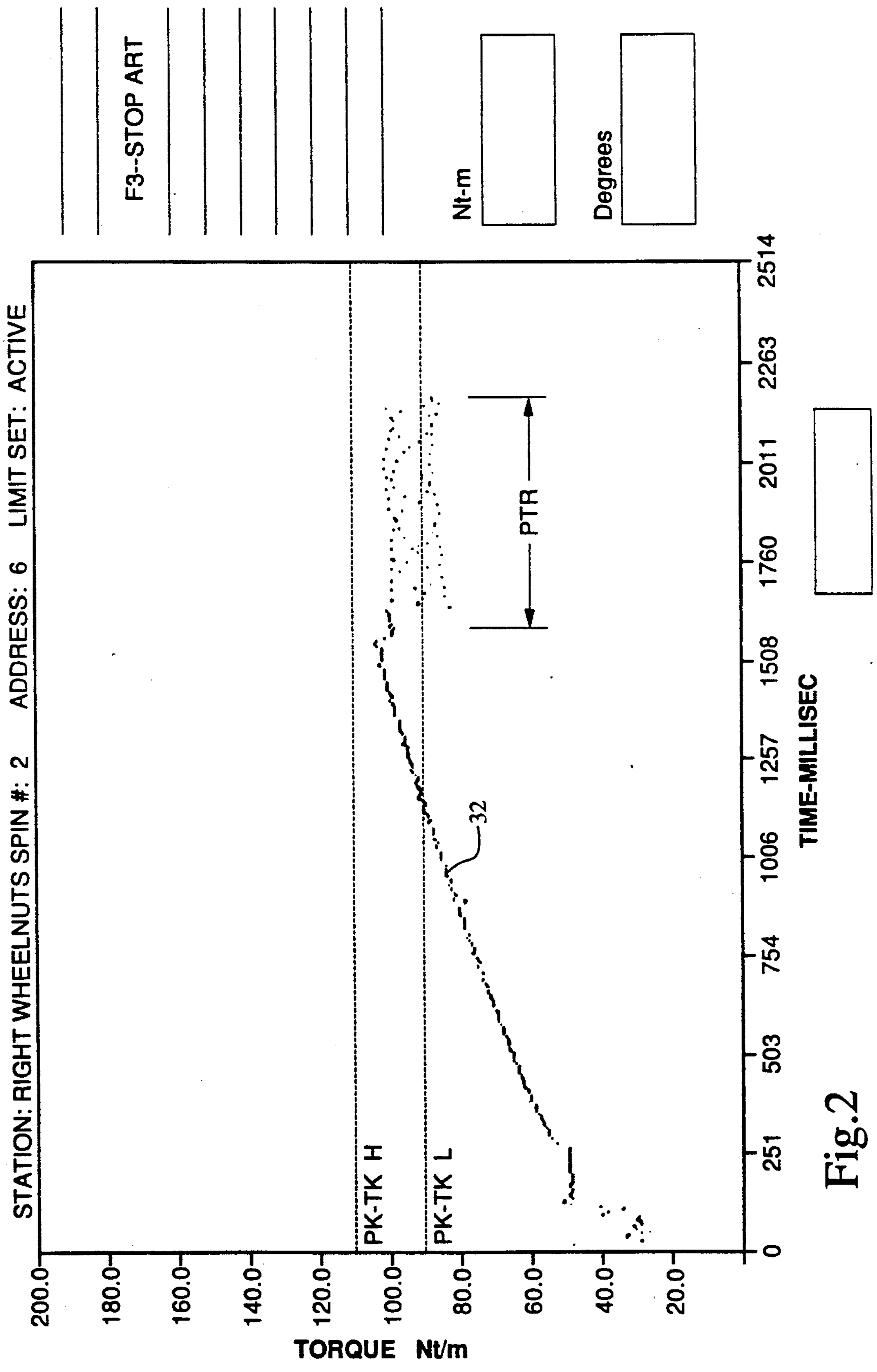
FIG. 2 is an exemplary torque/time plot made using the programmable pulse torque recovery system of the present invention.
Figure 3:
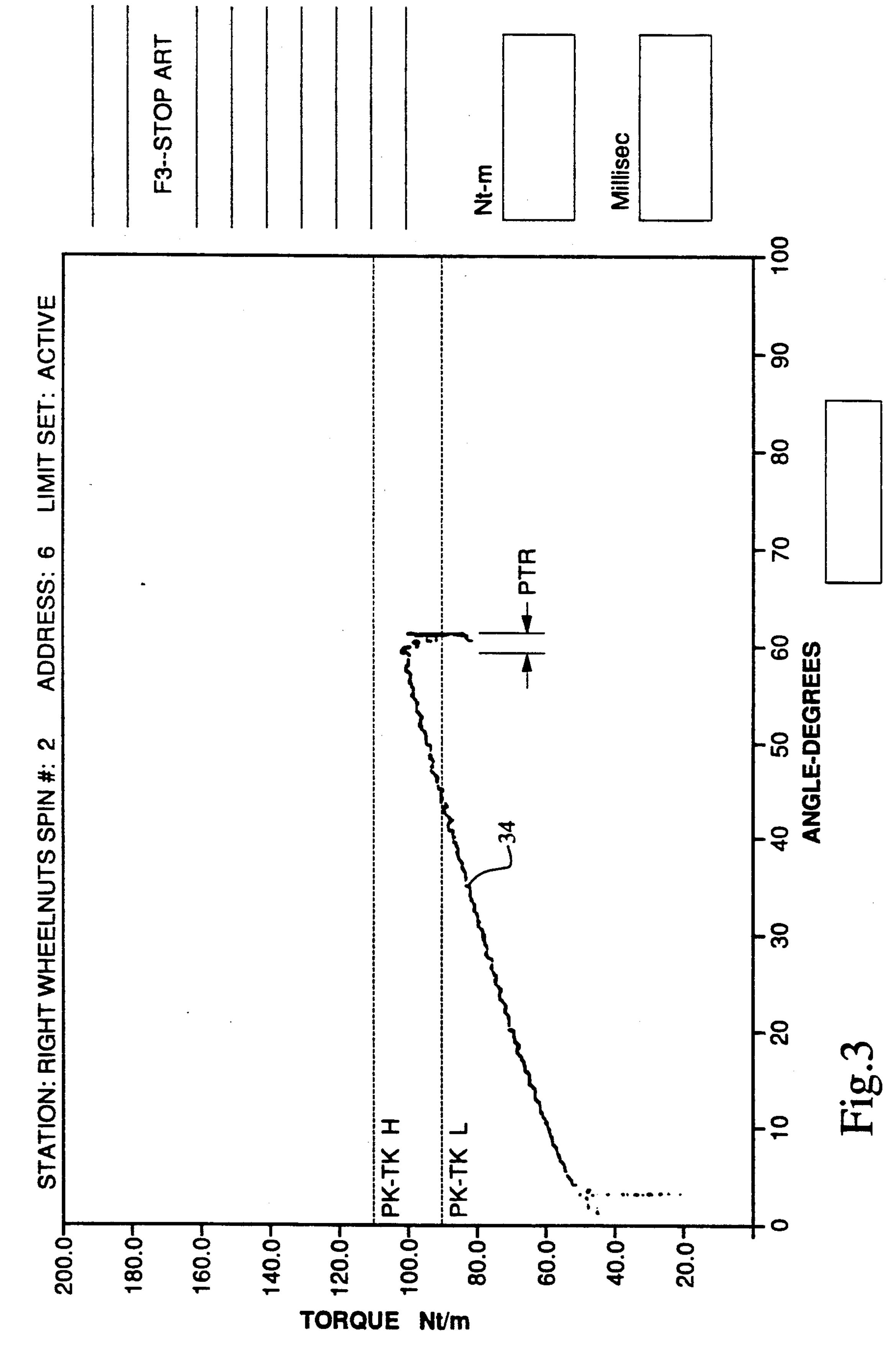
FIG. 3 is an exemplary torque/angle plot made using the programmable pulse torque recovery system of the present invention.

In accordance with the present invention, the control electronics 14 are programmed in a manner that allows a system user to not only select a pulsed torque recovery (PTR) period at the end of a tightening cycle (FIGS. 2 and 3), but also makes provision for the system user to program particular pulse maximum and minimum torque values and pulse torque duration (FIG. 5) as will be described in greater detail below. FIGS. 2 and 3 of the drawings relate to one another in that they depict the same exemplary tightening cycle including pulsed torque recovery (PTR). FIGS. 2 and 3 differ in that FIG. 2 relates torque to elapsed time, while FIG. 3 relates torque to angle of rotation. FIGS. 2 and 3 of the drawings show the torque/time and angle/time plots as part of one of the user friendly display screens of the above-mentioned DL3 Fastening System by ITD Automation.

As shown in FIG. 2 of the drawings, an exemplary tightening cycle plot 32 has a target torque of 100 Newton-meters of torque (Nt-m) and a pulsed torque recovery frequency of about 100 Hz. The pulsed torque (PTR) at the end of the tightening cycle is shown to occur from about 1508 milliseconds to about 2137 milliseconds. The pulsed torque amplitude ranged from a maximum of about 100 Nt-m to a minimum of about 80 Nt-m.

As shown in FIG. 3 of the drawings, the pulsed torque recovery (PTR) section of a tightening cycle plot 34 accounts for about a 5 degree increase in the angle of rotation of the threaded fastener from approximately 58 degrees to about 63 degrees. Thus, the programmable pulsed torque recovery feature of the present invention provided about a 5 degree rotation of the threaded fastener without raising the torque above the target or final torque of about 100 Nt-m.

Given, for example, that a 10 spindle multiple is used to drive 10 fasteners and, thereby, assemble a cylinder head to an engine block with a gasket between the cylinder head and block. In accordance with the present invention, the torque is pulsed after all 10 fasteners have been run down to the target torque. The torque is pulsed between 80 and 100% of the target torque so that a positive torque is maintained as the gasket material condenses and flows.

The pulsed torque technique of the present invention provides for a realization of torque recovery not possible with a conventional simple stall tightening process. The pulsation of the torque at the end of the tightening cycle in accordance with the present invention overcomes the static to dynamic torque condition of the joint. Typically, a greater torque is required to start a fastener to more than to keep it moving under a loaded condition.

The pulsed torque recovery of the present invention is programmable and, as such, provides for compatibility with soft, medium or even hard joints. For example, if a specific application has a very high static to dynamic torque ratio, the torque pulsation is programmed such that a high pulsed torque maximum amplitude value which is above the target torque will compensate for the condition. Conversely, if the application is extremely soft, such as a joint including a rubber bushing, the maximum amplitude value of the pulsed torque is set below the final torque.

Another advantage of the present invention is realized by programming the minimum pulsation torque value high enough to keep the nutrunner gear set and motor under load, thereby, assuring maximum gear and motor durability. Previous attempts at joint tightening using pneumatic systems which go from a no-load to a loaded condition have experienced considerable undesirable wear and degradation due to excessive impacting on the pneumatic motors and gear drive.

The frequency of torque pulsations is programmable in the system hardware. Experience has indicated that approximately 100 Hz is an optimum frequency with a range of from about 50 to 300 Hz being realistic for the mechanics of threaded fastening.

FIGS. 4 and 5 of the drawings depict exemplary user friendly DC motor programming screens which facilitate the programming of cycle steps and full scales (FIG. 4) and program jogs, backouts, and pulsed-torque-recovery speeds and torques (FIG. 5).

With particular reference to FIG. 4 of the drawings, the cycle steps and full scale screen makes provision for the entrance of values for motor full scale torque and speed, and several sequential steps each with speed, torque and time set points. This data, when written to memory, is available to the motor controller program operating in the nutrunner system. These values become set points to the PLC function of the fastening system and are automatically scaled to 12 bits by the program editor. Depending on full scale and the value entered, the value may be slightly rounded off since the analog system hardware has a resolution of one part in four thousand ninety-six. The speed and torque reference signals transmitted to the servo amplifiers in the present system 10 are 0 to 10 volts. As such, when entering the full scale values, the maximum motor speed and torque values are entered at 10 volts (at the tool).

With further reference to FIG. 4 of the drawings, the DC nutrunner system has the capability of sequential rundowns. In accordance with the preferred embodiment, up to five steps can be programmed with the set points of time (sec), speed (rpm), torque (e.u.), forward or reverse (fwd) or (rev), limit set number, cycle on (y/n), synchronization required (y/n), expedite on synchronization (y/n), and synchronization method (t/d/s/n). The time set point allows up to 3200 seconds to be assigned to each step of motor operation. The speed set point affords the system user the opportunity to select the nutrunner speed in rpm's in each of the steps. The torque set point provides for the entrance in engineering units of the torque desired to run the nutrunner to in each of the steps. The forward and reverse set point allows the user to select whether the motor should run in forward or reverse in each of the steps. The limit set point is the applicable spindle module limit set number associated with the cycle step. Complex operations such as pre-torque, backout, and fasten may use multiple limit sets to perform the operation correctly. The cycle on set point indicates whether or not the user wants the cycle on signal transmitted to the spindle module for each of the steps. Typically, on a reverse or backout operation, the spindle modules are not in cycle. The synchronation required set point is used to indicate whether or not the entire station must synchronize at this step. If synchronation is required (y), and the station does not successfully synchronize, the cycle is terminated. If synchronization is not required (n), the cycle will continue regardless of the synchronization succeeding or failing. The expedite on synchronization set point allows the user to indicate whether or not the process can exit the existing step early if station synchronization is achieved. Lastly, the sync method set point provides the following four options for synchronization: torque achieved (t) signaled directly from the servo amp; done (d) signalled from the spindle module indicating the algorithm is complete; sync (s) signal from the spindle module indicating that control reference torque is achieved; or none (n).

With particular reference to FIG. 5 of the drawings, the program jogs, backouts, and pulse torque recovery screen is used to facilitate programming the jog speed and torque, the manual backout speeds and torques, and to program the pulse torque recovery set points. The torque is pulsed following the last programmed cycle step. The pulsing high, low and duration set points are programmable items. In accordance with the preferred embodiment, the duty cycle is hard set within the PLC program.

The following is an exemplary ladder logic program listing of an exemplary DC motor program. The pulsed torque recovery of the present invention is accomplished within the ladder logic. The two sets of instructions that have the recurring beginning 123 and ending 384 instruction numbers effectively represent the oscillation between minimum and maximum torque value which is controlled by an overall program timer. The frequency of the oscillation is set at approximately 100 Hz, while it can be programmed in hardware (Eproms) between 50 and 300 Hz.

CPI Industrial Software Relay Lister, Version 2.03

STATION 01 PROGRAM 1 TEST IF PULSE TORQUE RECOVERY DISABLED

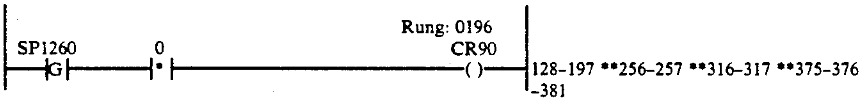

STATION 01 PROGRAM 1 PULSE TORQUE RECOVERY

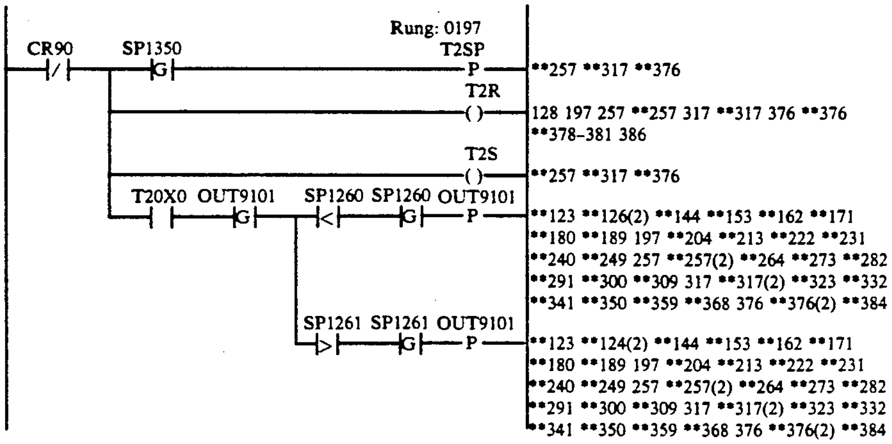

JUMP TO STATION 01 MISCELLANEOUS PROCESSING

-continued

CPI Industrial Software Relay Lister Version 2.03

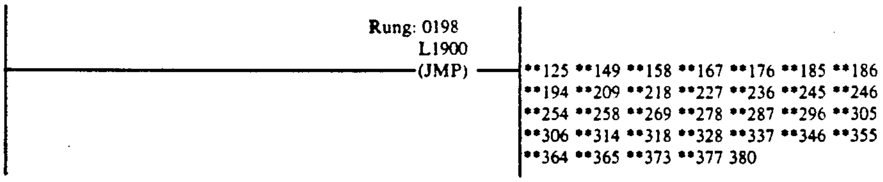

STATION 01 PROGRAM 2 -
IF NOT PROGRAM 2 SKIP TO PROGRAM 3

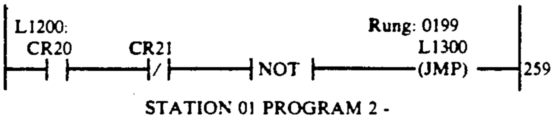

STATION 01 PROGRAM 2 -
IF STEPS COMPLETE SKIP STEP PROCESSING

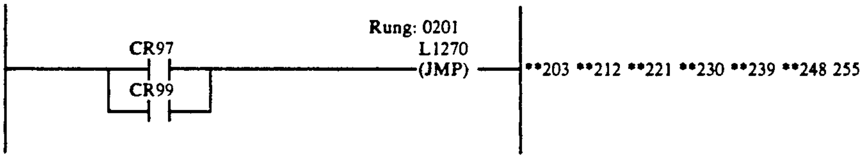

STATION 01 PROGRAM 2 STEP 1 -
IF NOT STEP 1 SKIP TO STEP 2

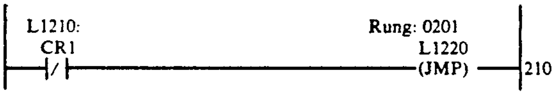

STATION 01 PROGRAM 2 STEP 1 INITIALIZATION -
IF INITIALIZED SKIP INIT

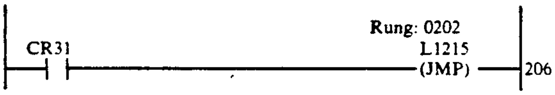

STATION 01 PROGRAM 2 STEP 1 -
IF STEP DISABLED SKIP STEP PROCESSING

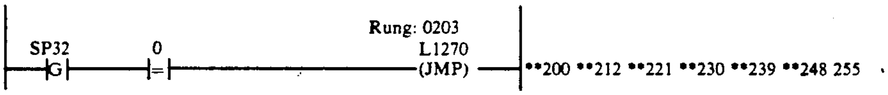

Thus, it will be appreciated that as a result of the present invention, a highly effective programmable pulse torque recovery system and method is provided and by which the stated objectives, among others, are completely fulfilled. It is contemplated that modifications and/or changes may be made in the illustrated embodiment without departure from the invention. Further, it will be apparent for those skilled in the art from the foregoing description and accompanying drawings that additional modifications and/or changes may be made, again without departure from the invention. Accordingly, it is expressly intended that the foregoing description and accompanying drawings are illustrative of a preferred embodiment only, not limiting, and that the true spirit and scope of the present invention be determined by reference to the appended claims.

What is claimed is:

1. In an electric nutrunner joint fastening system including one or more electric nutrunners having a motor and gearing, the improvement comprising:

a pulse torque nutrunner control circuit providing for one or more torque pulses at the end of each fastener tightening cycle to recover torque loss due to joint relaxation while maintaining said nutrunner motor under load so as to avoid excessive gear wear.

2. The electric nutrunner system of claim 1, wherein said pulse torque control circuit is programmable in order to provide for a selection of pulse maximum and minimum amplitudes.

3. The electric nutrunner system of claim 2, wherein said pulse torque control circuit is programmable with regard to pulse frequency so as to accommodate different joint applications.

4. The electric nutrunner system of claim 3, wherein said pulse torque control circuit facilitates the provision of a ramped torque increase to reduce gear wear.

5. In a method of tightening one or more threaded fastener joint assemblies using an electric nutrunner system including at least one electric nutrunner having a motor and gearing and a programmable motor control circuit, the improvement comprising the steps of:

providing one or more torque pulses at the end of a fastener tightening cycle to correct for joint relaxation while maintaining the nutrunner motor under a positive load to reduce motor and gear wear.

6. The method of claim 5, wherein said one or more torque pulses comprises a plurality of small amplitude high frequency pulses.

7. The method of claim 6, wherein said torque pulses occur at a frequency of approximately 100 Hz.

8. The method of claim 6, wherein said torque pulses occur within a frequency range of from approximately 50 to 300 Hz.

9. The method of claim 6, wherein said torque pulses have an amplitude range of from approximately 10% to 110% of the target torque.

10. The method of claim 6, wherein said torque pulses have an amplitude maximum which is below the final torque.

* * * * *